(12) United States Patent
Geris

(10) Patent No.: US 8,084,946 B2
(45) Date of Patent: Dec. 27, 2011

(54) METHOD OF DRIVING A FLASH DEVICE AND A NUMBER OF LOADS POWERED BY A BATTERY AND HANDHELD ELECTRONIC DEVICE INCLUDING THE SAME

(75) Inventor: Ryan A. Geris, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 473 days.

(21) Appl. No.: 12/393,094

(22) Filed: Feb. 26, 2009

(65) Prior Publication Data

US 2010/0213842 A1  Aug. 26, 2010

(51) Int. Cl.
  *G03B 15/05* (2006.01)
  *H04N 5/225* (2006.01)
(52) U.S. Cl. .................. 315/33; 315/308; 315/200 A
(58) Field of Classification Search .............. 315/33, 315/291, 308, 200 A; 396/205
  See application file for complete search history.

(56) References Cited

U.S. PATENT DOCUMENTS

| 5,352,968 | A | 10/1994 | Reni et al. |
| 2007/0024235 | A1 | 2/2007 | Guthrie |
| 2007/0123303 | A1 | 5/2007 | Book et al. |
| 2007/0123304 | A1 | 5/2007 | Pattenden et al. |
| 2007/0188131 | A1 | 8/2007 | Guthrie |
| 2007/0195062 | A1 | 8/2007 | Guthrie |
| 2008/0014997 | A1 | 1/2008 | Guthrie et al. |
| 2008/0037979 | A1 | 2/2008 | Guthrie et al. |
| 2008/0129219 | A1 | 6/2008 | Smith et al. |
| 2008/0164847 | A1 | 7/2008 | Drader et al. |
| 2009/0085502 | A1* | 4/2009 | Geris et al. ............... 315/308 |

FOREIGN PATENT DOCUMENTS

| JP | 11282064 A | 10/1999 |
| JP | 2006-058482 A | 3/2006 |
| WO | 2004/029642 A1 | 4/2004 |

OTHER PUBLICATIONS

Texas Instruments Incorporated, Single Cell Li-Ion and Li-Pol Battery Gas Gauge IC for Portable Applications (bqJUNIOR), Mar. 2006, 31 pp.

* cited by examiner

*Primary Examiner* — Daniel D Chang
(74) *Attorney, Agent, or Firm* — Louis B. Allard; Borden Ladner Gervais LLP

(57) ABSTRACT

A handheld electronic device includes a processor; a battery; a flash device; a number of loads powered by the battery; and a flash driver outputting a flash current to the flash device. The processor determines a temperature operatively associated with the battery and different voltage values corresponding to different combinations of the loads as a function of the determined temperature, and starts the flash device at a predetermined flash current value. The flash driver selects a corresponding different voltage value as a function of: (a) a determined number of the loads which are active, or (b) a current flowing from the battery; determines the battery voltage, and if the battery voltage is less than or equal to the corresponding different voltage value, reduces the flash current below the predetermined flash current value until the battery voltage is greater than the corresponding different voltage value.

18 Claims, 4 Drawing Sheets

METHOD OF DRIVING A FLASH DEVICE AND A NUMBER OF LOADS POWERED BY A BATTERY AND HANDHELD ELECTRONIC DEVICE INCLUDING THE SAME

BACKGROUND

1. Field

The disclosed and claimed concept relates generally to handheld electronic devices and, more particularly, to handheld electronic devices including a flash device and a battery. The disclosed and claimed concept also relates to methods of driving a flash device of a handheld electronic device including a battery.

2. Description of the Related Art

Numerous types of handheld electronic devices are known. Examples of such handheld electronic devices include, for instance, personal data assistants (PDAs), handheld computers, two-way pagers, cellular telephones, e-mail devices and the like. Such handheld electronic devices are generally intended to be portable and thus are small and battery powered. While some handheld electronic devices include a wireless communication capability, other handheld electronic devices are standalone devices that do not communicate with other devices.

Some handheld electronic devices include a camera and a light emitting diode (LED) camera flash, and are powered by a single lithium ion battery. The current drawn from operating the LED camera flash is relatively very large (e.g., without limitation, up to about 1.2 A; any suitable value) for a relatively long period of time (e.g., without limitation, up to about 80 mS; up to about 250 mS; any suitable value) and can easily brown-out the device under certain conditions. Brown-out is also known as battery droop and means that the battery voltage drops to a level that can impair the operation of other device functions, possibly even causing the device to reset. A lithium ion battery's ability to maintain its voltage is dependent upon various factors, such as the age of the battery and its temperature (i.e., the equivalent series resistance (ESR) of the battery varies with these parameters). For example, when the battery voltage is low or if the battery is cold, then the battery ESR may be too high to support a camera flash. In such cases, the battery droop may trip battery supervisory circuits, causing the device to reset or go into a sleep mode. This can be a frustrating experience for the user.

U.S. Patent Application Pub. No. 2008/0037979 discloses in its Background section that one approach to try and address the problem of battery droop is to map known levels of battery capacity and voltage into tables that are associated with events that should occur at those battery capacity levels. This can be an effective approach for components that draw relatively small or steady amounts of power. However, for a flash or other high-intensity component, a large margin of battery reserve is needed as the momentary conditions of a battery that can withstand such a high-intensity burst can vary.

Publication 2008/0037979 further discloses an electronic device in which the battery level is measured, a determination is made if the battery level exceeds a predetermined threshold, and, if not, then a flash photograph is not permitted. Otherwise, if the battery level exceeds the predetermined threshold, then flash settings are adjusted to reduce power consumption by the flash so as to not cause a supervisory circuit to shut down the device. The exact settings for the flash can be chosen so as to maximize the amount of light output from the flash, but without tripping the supervisor circuit. Numerous profiles or representations thereof can be gathered for different start voltages of the battery and different ambient temperatures. An average version of the profiles can be established by determining profiles for a number of substantially identical copies of the device, so that variability, between devices can be ascertained and considered when establishing profiles.

U.S. Patent Application Pub. No. 2008/0014997 discloses a battery-powered communications device including a slump monitoring system, which monitors the battery voltage. The slump monitoring system determines if the monitored value is below a predetermined threshold. The predetermined threshold may be a dynamic parameter that depends on the transmit power level required for a given transmission. If the value is below the predetermined threshold, then the slump monitoring system sends an interrupt signal to terminate the transmission, which causes a transmitter to be powered down. If the monitored value is above the predetermined threshold, then the slump monitoring system continues to monitor. The slump monitoring system can include an analog to digital converter (ADC), a trigger input, a trigger delay, one or more analog inputs, a control/math block, and one or more outputs. The one or more analog inputs receive one or more signals related to battery voltage level or temperature and provide these signals to the ADC.

Some prior proposals use a pre-flash function to determine the ESR of the battery. U.S. Patent Application Pub. No. 2008/0164847 discloses a method and apparatus for maintaining a maximum sustained flash current over the whole length of a flash using a programmable current drive in a handheld portable device powered by a battery. The method measures the battery voltage before and after a flash is initiated and calculates the ESR of the battery, without using temperature data and age of the battery. The calculated ESR is then used to adjust the flash current. The process is repeated to correct for errors in the flash current.

In some prior proposals, since most of the factors that affect brown-out are not generally known to the user at the time of system operation (e.g., age of the battery; current temperature; size of the system load and flash load), a worst case voltage droop is assumed when a decision is made whether to activate the flash, if brown-out is to be avoided. However, assuming the worst case severely limits the usefulness of the flash (i.e., the flash won't trigger sometimes, even though the system could probably sustain a flash pulse) since the LED flash current drawn from the battery is calculated to be higher than it really is.

There is room for improvement in handheld electronic devices including a flash device and a battery.

There is also room for improvement in methods of driving a flash device of a handheld electronic device including a battery.

BRIEF DESCRIPTION OF THE DRAWINGS

A full understanding of the disclosed and claimed concept can be gained from the following description of the preferred embodiments when read in conjunction with the accompanying drawings in which:

Similar numerals refer to similar parts throughout the specification.

DESCRIPTION

Figure 1:
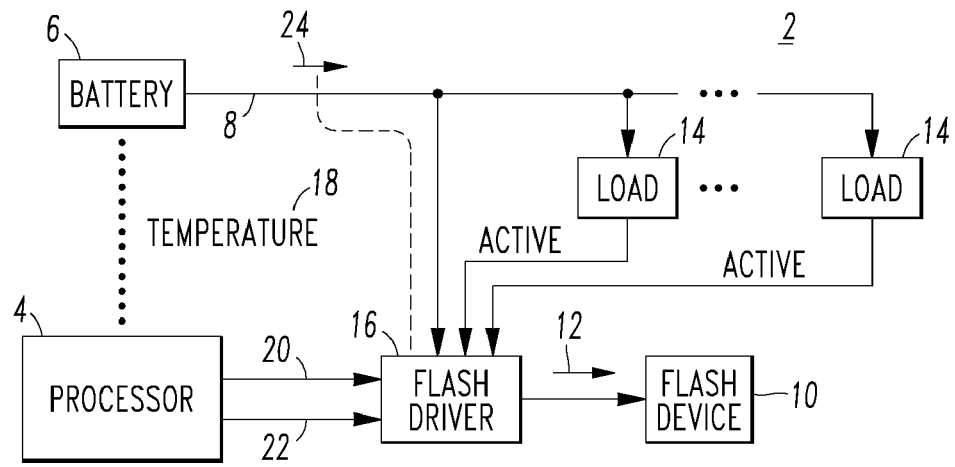
FIG. 1 is a block diagram of a handheld electronic device in accordance with embodiments of the disclosed and claimed concept.

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "current load" includes, for example and without limitation, a number of handheld electronic device current loads; a number of relatively high current loads such as, for example and without limitation, a 2G radio; a 3G radio; a CDMA (Code-Division Multiple Access) radio; a UMTA radio; a WLAN radio; a HSDPA radio; a GSM (global system for mobile communications) radio; a WIFI radio; a UMTS (Universal Mobile Telecommunications System) radio; GSM Evolution (EDGE) radio; Enhanced GPRS (EGPRS) radio; IMT Single Carrier (IMT-SC) radio; 3GPP LTE (Long Term Evolution) radio; any circuit or sub-system that can draw current over a suitable "heavy current load" threshold (e.g., without limitation, about 500 mA; any suitable value), any, some or all of which could occur during a flash.

Since a flash (e.g., without limitation, LED flash) draws a relatively large current and a number of other subsystems of a handheld electronic device can draw more current, there is a need for a method and apparatus to determine the desired total current from the battery and, then, determine the desired (e.g., without limitation, maximum) operating current of the LED flash. There is a need to limit the LED flash current to such a desired value, without resetting or turning off the device, while considering various potential high current loads. A method and apparatus is desired that can more accurately estimate the desired maximum flash current that is sustainable during a flash without having to use worst case assumptions.

In some embodiments of the disclosed and claimed concept, a handheld electronic device determines a temperature operatively associated with a battery before triggering a flash. The battery temperature reading is used to determine a plurality of voltage droops caused by a plurality of different current loads, any, some or all of which could occur during a flash. The voltage droops are added to a minimum allowed voltage in the device to provide a plurality of different minimum voltage threshold values, which can, for example, be saved to a flash driver or a suitable memory element before a flash is triggered. After the flash is triggered, the flash driver determines the battery voltage and starts the flash. After the flash is started, the battery voltage is repetitively monitored. A corresponding minimum voltage threshold value is selected based upon the number of present current loads and is compared to the battery voltage. If the selected corresponding minimum voltage threshold value equals the battery voltage, then the flash driver reduces the flash current until the battery voltage is greater than the selected corresponding minimum voltage threshold value.

Some embodiments of the disclosed and claimed concept drive a flash device by considering the temperature operatively associated with the battery and the present load powered by the battery. Furthermore, relatively few calculations are performed by the flash driver during the flash. Also, the calculations done by the processor during the flash are reduced or preferably are minimized.

In accordance with one aspect of the disclosed and claimed concept, a method drives a flash device of a handheld electronic device including a number of loads powered by a battery having a voltage. The method comprises: determining a temperature operatively associated with the battery; determining a plurality of different voltage values corresponding to a plurality of different combinations of the number of loads as a function of the determined temperature; starting the flash device at a predetermined value of flash current of the flash device; selecting a corresponding one of the plurality of different voltage values as a function of: (a) a determined number of the number of loads which are active, or (b) a current flowing from the battery; determining the voltage of the battery; and if the voltage of the battery is less than or equal to the corresponding one of the plurality of different voltage values, then reducing the flash current below the predetermined value of the flash current until the voltage of the battery is greater than the corresponding one of the plurality of different voltage values.

The method may further comprise after the starting the flash device, repetitively repeating the determining the voltage of the battery and repetitively repeating the reducing the flash current if the voltage of the battery is less than or equal to the corresponding one of the plurality of different voltage values.

The method may further comprise determining a plurality of the plurality of different voltage values from $Vmin(Ibat) = Vlow\text{-}sys + Ibat*ESR(T)$; employing Ibat as a possible current from the battery corresponding to a number of the number of loads powered by the battery; employing ESR(T) from a look-up table of equivalent series resistance of the battery versus temperature operatively associated with the battery; and employing Vlow-sys as a voltage at which the handheld electronic device will reset or shutdown.

The method may further comprise employing a current sensor to provide a sensed current from the current flowing from the battery; and determining the corresponding one of the plurality of different voltage values from the sensed current and from the plurality of the plurality of different voltage values.

In accordance with another aspect of the disclosed and claimed concept, a handheld electronic device comprises: a processor; a battery having a voltage; a flash device including a flash current; a number of loads powered by the battery; and a flash driver structured to output the flash current to the flash device, wherein the processor is structured to determine a temperature operatively associated with the battery, determine a plurality of different voltage values corresponding to a plurality of different combinations of the number of loads as a function of the determined temperature, and start the flash device at a predetermined value of the flash current, and wherein the flash driver is structured to select a corresponding one of the plurality of different voltage values as a function of: (a) a determined number of the number of loads which are active, or (b) a current flowing from the battery; determine the voltage of the battery, and if the voltage of the battery is less than or equal to the corresponding one of the plurality of different voltage values, then reduce the flash current below the predetermined value of the flash current until the voltage of the battery is greater than the corresponding one of the plurality of different voltage values.

In accordance with another aspect of the disclosed and claimed concept, a method drives a flash device of a handheld electronic device including a number of loads powered by a battery having a voltage and a current flowing from the battery, the flash device includes a flash current. The method comprises: determining an equivalent series resistance (ESR) of the battery; determining a plurality of different voltage values corresponding to the equivalent series resistance (ESR) and a plurality of different possible currents flowing from the battery; starting the flash device at a predetermined value of the flash current; sensing the current flowing from the battery; selecting a corresponding one of the plurality of different voltage values as a function of the sensed current; determining the voltage of the battery; and if the voltage of the battery is less than or equal to the corresponding one of the plurality of different voltage values, then reducing the flash current below the predetermined value of the flash current until the voltage of the battery is greater than the corresponding one of the plurality of different voltage values.

In accordance with another aspect of the disclosed and claimed concept, a handheld electronic device comprises: a processor; a battery having a voltage; a flash device including a flash current; a number of loads powered by the battery; and a flash driver structured to output the flash current to the flash device, wherein the processor is structured to determine an equivalent series resistance (ESR) of the battery, determine a plurality of different voltage values corresponding to the equivalent series resistance (ESR) and a plurality of different possible currents flowing from the battery, and start the flash device at a predetermined value of the flash current, and wherein the flash driver is structured to sense the current flowing from the battery, select a corresponding one of the plurality of different voltage values as a function of the sensed current, determine the voltage of the battery, and if the voltage of the battery is less than or equal to the corresponding one of the plurality of different voltage values, then reduce the flash current below the predetermined value of the flash current until the voltage of the battery is greater than the corresponding one of the plurality of different voltage values.

Referring to FIG. 1, a handheld electronic device 2 includes a processor 4, a battery 6 having a voltage 8, a flash device 10 including a flash current 12, a number of loads 14 powered by the battery 6, and a flash driver 16 structured to output the flash current 12 to the flash device 10. The processor 4 is structured to determine a temperature 18 (e.g., without limitation, a battery temperature (e.g., without limitation, internal, external, or proximate a battery); ambient temperature; device temperature) operatively associated with the battery 6, determine a plurality of different voltage values 20 corresponding to a plurality of different combinations of the number of loads 14 as a function of the determined temperature, and start, at 22, the flash device 10 at a predetermined value of the flash current 12. The different voltage values 20 may be saved to the flash driver 16 or a suitable memory element. The flash driver 16 is structured to select a corresponding one of the different voltage values 20 as a function of: (a) a determined number of the number of loads 14 which are active, or (b) a current 24 flowing from the battery. The flash driver 16 is further structured to determine the voltage 8 of the battery 6, and if the battery voltage 8 is less than or equal to the corresponding one of the different voltage values 20, then reduce the flash current 12 below the predetermined value of the flash current until the battery voltage 8 is greater than the corresponding one of the different voltage values 20.

Figure 2:
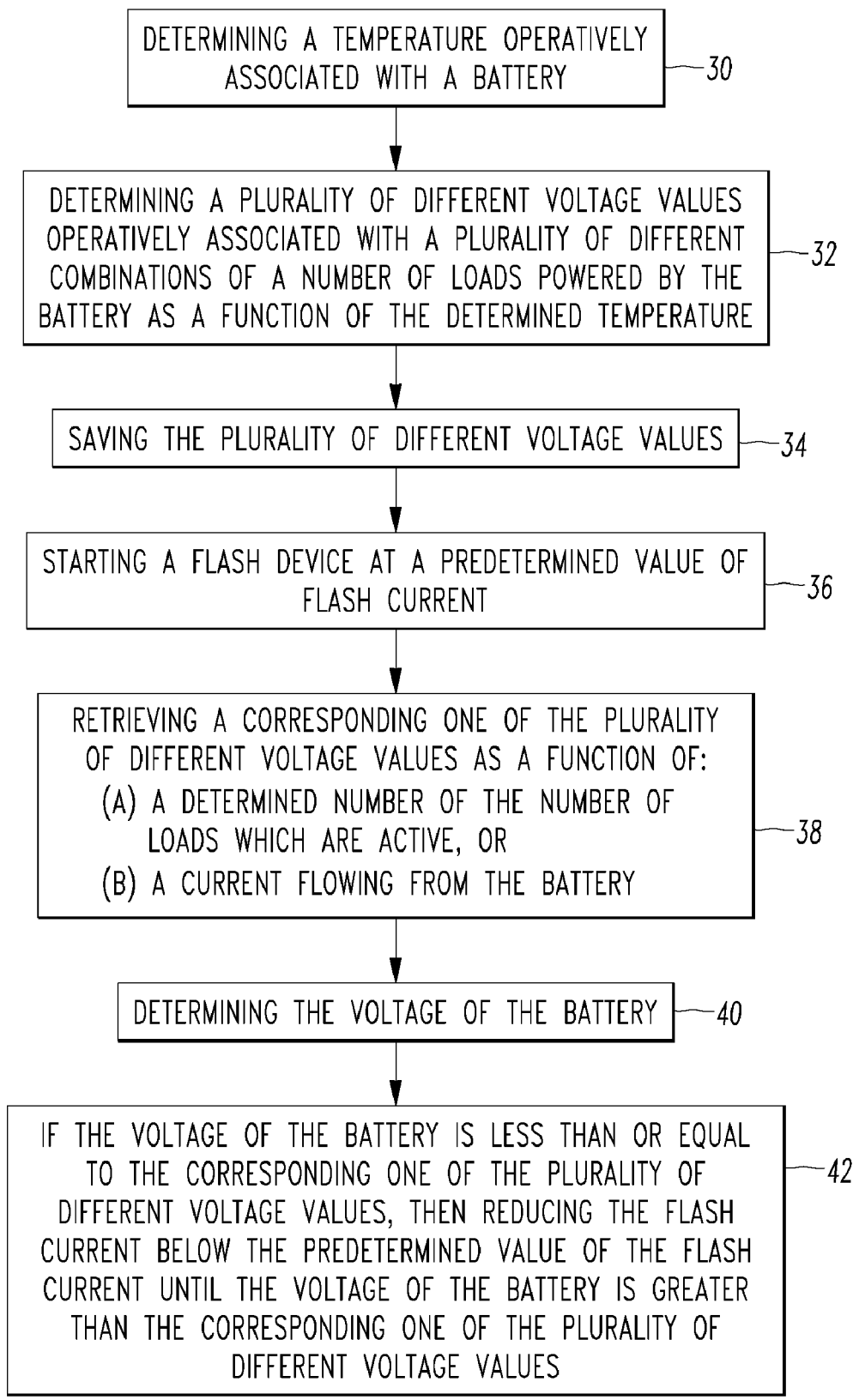
FIG. 2 is a flowchart of a method of driving a flash device of a handheld electronic device in accordance with other embodiments of the disclosed and claimed concept.

FIG. 2 illustrates a method of driving a flash device (e.g., without limitation, the flash device 10 of FIG. 1) of a handheld electronic device including a number of loads powered by a battery having a voltage. The method includes determining, at 30, a temperature operatively associated with the battery. At 32, a plurality of different voltage values corresponding to a plurality of different combinations of the number of loads are determined as a function of the determined temperature. The plurality of different voltage values may be saved in a memory element, at 34. At 36, the flash device is started at a predetermined value of flash current of the flash device. At 38, a corresponding one of the plurality of different voltage values is selected as a function of: (a) a determined number of the number of loads which are active, or (b) a current flowing from the battery. At 40, the voltage of the battery is determined along with whether the voltage of the battery is less than or equal to the corresponding one of the plurality of different voltage values. Then, at 42, the flash current is reduced below the predetermined value of the flash current until the voltage of the battery is greater than the corresponding one of the plurality of different voltage values.

While example elements are shown in FIGS. 1 and 2, the disclosed concept is not limited to those example elements.

EXAMPLE 1

Figure 3:
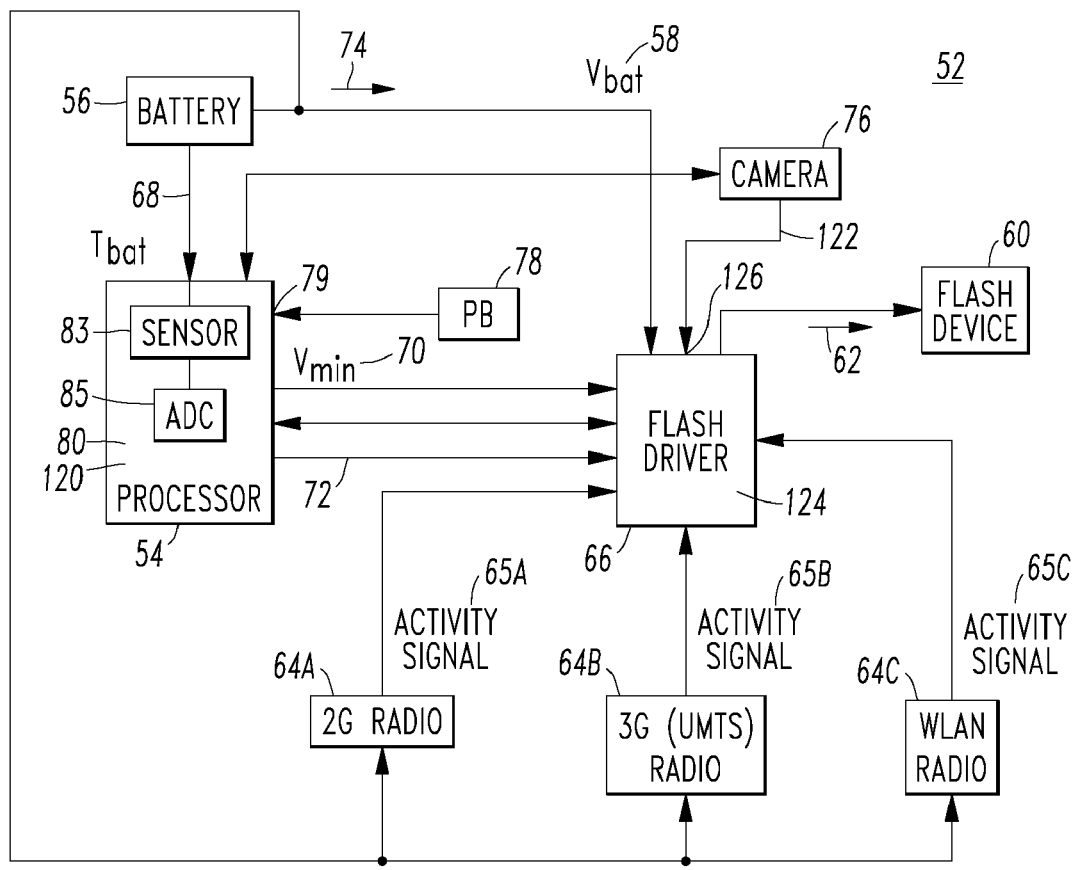
FIG. 3 is a block diagram of a handheld electronic device in accordance with another embodiment of the disclosed and claimed concept.

Another example of a handheld electronic device 52 is shown in FIG. 3. Somewhat similar to the handheld electronic device 2 of FIG. 1, the device 52 includes a processor 54, a battery 56 having a voltage 58 (Vbat), a flash device 60 including a flash current 62, a plurality of different radios 64,64B,64C powered by the battery 56, and a flash driver 66 structured to output the flash current 62 to the flash device 60. The processor 54 is structured to determine a temperature 68 (Tbat) (e.g., without limitation, ambient temperature; battery temperature (e.g., without limitation, internal, external or proximate a battery); device temperature) operatively associated with the battery 56, determine a plurality of different voltage values 70 (Vmin) corresponding to a plurality of different combinations of the plurality of different radios 64,64B,64C as a function of the determined temperature, and start, at 72, the flash device 50 at a predetermined value of the flash current 62. The different voltage values 70 can be saved to the flash driver 66, as shown, or to any suitable memory element (e.g., without limitation, of the processor 54; of the flash driver 66) of the device 52.

The flash driver 66 is structured to select a corresponding one of the different voltage values 70 as a function of: (a) a determined number of the plurality of different radios 64,64B,64C, which are active as indicated by activity signals 65A,65B,65C, respectively, or (b) a current 74 flowing from the battery 56. The flash driver 66 is further structured to determine the voltage 58 of the battery 56, and if the battery voltage 58 is less than or equal to the corresponding one of the different voltage values 70, then reduce the flash current 62 below the predetermined value of the flash current until the battery voltage 58 is greater than the corresponding one of the different voltage values 70.

For convenience, the disclosed and claimed concept is described as applied to an example flash device 60, which can be an LED flash section, although any suitable flash device for a handheld electronic device can be employed. The flash device 60 is preferably used together with a camera 76 and a pushbutton (PB) 78, as will be described, below, in connection with Example 2.

It will be appreciated that the example handheld electronic device 52 could also include one or more of a suitable input apparatus (not shown), a suitable output apparatus (not shown), a microphone (not shown), a speaker (not shown), and a display (not shown).

EXAMPLE 2

Figure 4:
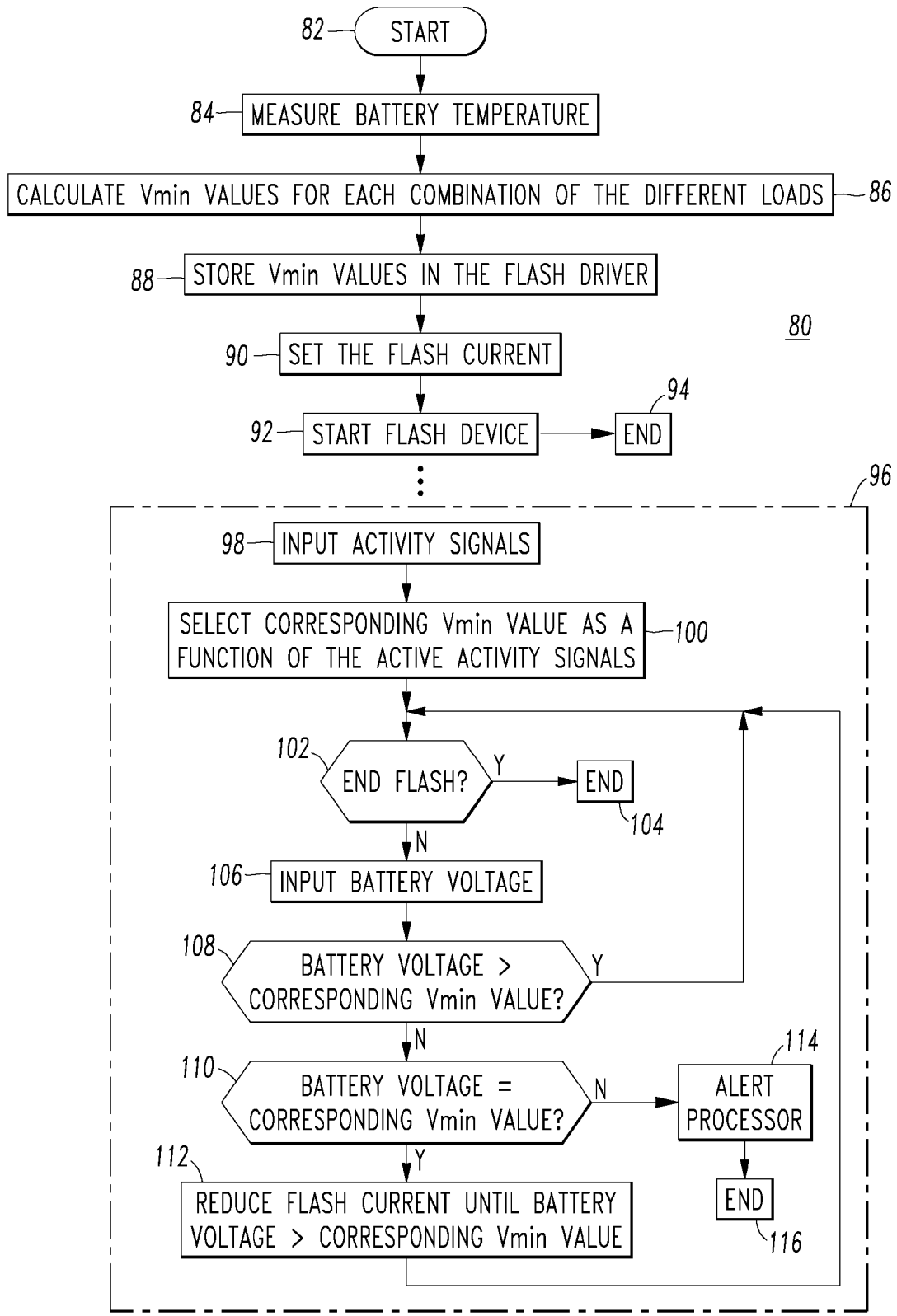
FIG. 4 is a flowchart of a routine of the processor of FIG. 3.

FIG. 4 illustrates an example routine 80 of the processor 54 of FIG. 3. After starting, at 82, the processor 54 determines the battery temperature (Tbat) 68 using a suitable temperature sensor 83 operatively associated with (e.g., without limitation, a component internal to (as shown in FIG. 3) a processor; a component on or external to (not shown) a processor; a distinct component (not shown); a component internal to, on or external to (not shown) a battery powering a processor) the processor 54. Next, at 86, the processor 54 calculates Vmin values 70 for each combination of the different radios 64A, 64B,64C (e.g., none, any one, any two or all three of the example radios being potentially active as can be indicated by the corresponding activity signals 65A,65B,65C, respectively). Then, at 88, the processor 54 stores the Vmin values 70 in the flash driver 66, and, at 90, sets a predetermined value in the flash driver 66 for the initial flash current 62. Finally, the processor 54 starts the flash device 60 by sending a start signal 72 to the flash driver 66, before the routine 80 ends, at 94.

The start signal 72 initiates a suitable hardware and/or software flash driver process 96 in the flash driver 66. First, at 98, the flash driver 66 inputs the activity signals 65A,65B, 65C. Next, at 100, the flash driver 66 selects a corresponding one of the Vmin values 70 as a function of the active activity signals 65A,65B,65C. Then, at 102, it is determined if the flash driver process 96 has ended, and, if so, the process 96 ends at 104. Otherwise, at 106, the flash driver 66 inputs the battery voltage 58 and, at 108, determines if the battery voltage 58 is greater than the selected corresponding one of the Vmin values 70 from 100. If so, then step 102 is repeated. Otherwise, at 110, the flash driver 66 determines if the battery voltage 58 is equal to the selected corresponding one of the Vmin values 70 from 100. If so, then the flash driver 66 reduces the flash current 62 (e.g., by a suitable current value; by a suitable percentage) until the battery voltage 58 is greater than the selected corresponding one of the Vmin values 70 from 100, as will be described. Then, steps 102, 106, 108, 110 and 112 can be repeated, as needed, to accomplish this goal. On the other hand, if the battery voltage 58 is not equal to the selected corresponding one of the Vmin values 70 from 100, then it is less than that value and, thus, the flash driver 66 stops the flash device 60 and alerts (e.g., without limitation, provides a digital input to; interrupts) the processor 54, at 114, before ending, at 116.

The example routine 80 starts, for example, when a user presses the camera shutter pushbutton 78 of the camera 76 under suitable low light conditions. The processor 54 includes an input 79 structured to receive a camera shutter signal from the camera pushbutton 78 and responsively start the routine 80. Hence, the routine 80 of FIG. 4 is run in response to a user pressing the button 78 to take a picture with the camera 76 after the processor 54 or other suitable circuit determines that the flash from the flash device 60 is needed.

EXAMPLE 3

The example flash driver 66 is a hardware circuit external to (e.g., separate from) the processor 54. This hardware circuit is controlled by the example processor routine 80, which determines a number of the Vmin values 70 and stores those number of values in the flash driver 66.

Alternatively, the flash driver 66 can be contained in a suitable microcomputer and/or as part of a processor.

EXAMPLE 4

An example of the calculation of one of the Vmin values 70 (FIG. 3) is shown in Equation 1, below. The temperature (e.g., T=Tbat 68) is determined and a look-up table 120 is employed to determine the ESR(T) of the battery 56.

$$Vmin = Vlow\text{-}sys + I(hl) * ESR(T) \qquad (Eq.\ 1)$$

wherein:

T is a temperature operatively associated with the battery 56 (e.g., without limitation, ambient temperature; battery temperature (e.g., without limitation, internal, external, or proximate a battery); device temperature);

Vlow-sys is the voltage at which the handheld electronic device 52 will reset or shutdown;

I(hl) is the sum of the different current loads (e.g., without limitation, heavy current loads; loads of the example radios 64A,64B,64C) that could occur during a flash after the starting the flash device 60; and ESR(T) is the look-up table value for the ESR of the battery 56 based on the temperature (T).

EXAMPLE 5

For example, the temperature sensor 83 of FIG. 3 is operatively associated with (e.g., without limitation, internal, external, or proximate a battery; sensing ambient temperature near a battery; sensing temperature of a device which uses a battery) the battery 56 to determine the temperature (Tbat) 68 operatively associated with the battery 56 and output a corresponding analog signal. The processor 54 includes an analog to digital converter (ADC) 85 structured to input the analog signal and output a digital value corresponding to the battery temperature (Tbat) 68.

EXAMPLE 6

At 90 of FIG. 4, the processor 54 initially programs the flash driver 66 for the desired maximum flash current (e.g., without limitation, about 900 mA) and starts the camera 76. Then, the camera 76 sends a signal 122 to the flash driver 66 to start the flash device 60, in order that it is suitably synchronized with the camera 76. In this example, the flash driver 66 inputs a number of: (a) the different voltage values 70 from the processor 54; (b) the predetermined desired maximum flash current value from the processor 54; and (c) the synchronization signal 122 from the camera 76.

EXAMPLE 7

Before, during or after the flash by the flash device 60, there can be any suitable number of loads (e.g., without limitation, "heavy current loads") active at one time. As a non-limiting example, in the disclosed handheld electronic device 52, there can be up to about three (as shown by the example radios 64A,64B,64C) or four (not shown) "heavy current loads" active at one time, although the disclosed and claimed concept is applicable to any suitable larger or smaller number of "heavy current loads", any suitable larger or smaller number of loads, or any suitable battery current drawn from the battery 56 by the handheld electronic device 52.

EXAMPLE 8

In the example routine 80 FIG. 4, the flash driver 66 automatically reduces the flash current 62 if the selected corresponding one of the Vmin values 70 from 100 is reached. However, if the flash driver 66 determines that Vbat 58 is less than the selected corresponding Vmin value 70, then the flash driver 66 stops the flash device 60 and sends a suitable warning or interrupt, at 114, to the processor 54.

EXAMPLE 9

The battery 56 or the processor 54 employs a suitable sensor 83 (e.g., without limitation, a silicon diode; a gallium arsenide diode; any suitable active or passive temperature determining, measuring or sensing device (e.g., RTDs (resistive temperature detectors), various metals (e.g., copper, nickel, platinum) having resistance, voltage or current characteristics versus temperature); any suitable temperature sensor) to determine the battery temperature (Tbat) 68 in combination with the ADC 85 of the processor 54 or of an associated Power Management IC (PMIC) (not shown). Alternatively, the sensor 83 and/or the ADC 85 can be employed at any suitable location in the device 52.

EXAMPLE 10

The example flash driver 66 preferably includes a suitable circuit 124 for comparing the selected corresponding one of the Vmin values 70 from 100 of FIG. 4 to the battery voltage (Vbat) 58 (e.g., without limitation, a suitable processor having an ADC; a suitable comparator). For example, in an example hardware circuit embodiment of the example flash driver 66, the circuit 124 is a comparator circuit structured to compare the battery voltage (Vbat) 58 with the selected corresponding Vmin value 70.

EXAMPLE 11

At 102 of FIG. 4, the removal of the synchronization signal 122 from the camera 76 can be employed by the flash driver 66 at input 126 to end the flash from the flash device 60. Preferably, the flash driver 66 includes a suitable timer (e.g., a time out function) to alternatively end the flash after a predetermined time period after the flash device 60 is started responsive to the activation of the synchronization signal 122 from the camera 76.

EXAMPLE 12

There can be, for example and without limitation, one "high current load" or several (e.g., without limitation, two, three, four or more) "high current loads" that all can occur at the same time and either before, during or after the flash from the flash device 60. FIGS. 3 and 4 show that the processor 54 initially calculates a Vmin value 70 for each high current load combination and stores the various Vmin values 70 in the flash driver 66. During the flash, the flash driver 66 determines which number of the various "high current loads" are active based upon a number of corresponding activity signals 65A,65B,65C. Based upon the number of corresponding activity signals 65A,65B,65C that are active, the corresponding one of the Vmin values 70 is selected at 100 of FIG. 4.

For example, if there are three example "high current loads" A, B and C, then the processor 54 calculates and stores an example eight (=$2^3$) Vmin values 70 for: (1) none of A, B and C active; (2) only A active; (3) only B active; (4) only A and B active; (5) only C active; (6) only A and C active; (7) only B and C active; and (8) all of A, B and C active. Then, based upon the activity signals 65A,65B,65C, the flash driver 66 selects the proper one of the Vmin values 70.

EXAMPLE 13

In known flash drivers, if a relatively high current load occurs during a flash, then this could adversely impact the battery voltage. To prevent this, the disclosed flash driver 66 monitors a number of relatively high current loads 64A,64B, 64C during the flash using, for example, the activity signals 65A,65B,65C. If a relatively high current load occurs during the flash, then a different corresponding Vmin value 70 is compared to the battery voltage 58. Various Vmin values 70 for a number of combinations of one, some or all of the various possible loads are calculated by the processor 54 before the flash and are stored by the flash driver 66. Then, after the flash device 60 is started, the flash driver 66 repetitively repeats determining the battery voltage (Vbat) 58 and repetitively repeats reducing the flash current 62 if the battery voltage (Vbat) 58 is less than or equal to the selected corresponding one of the Vmin values 70 from 100 of FIG. 4. This continues until the flash driver 66 stops the flash device 60.

EXAMPLE 14

Figure 5:
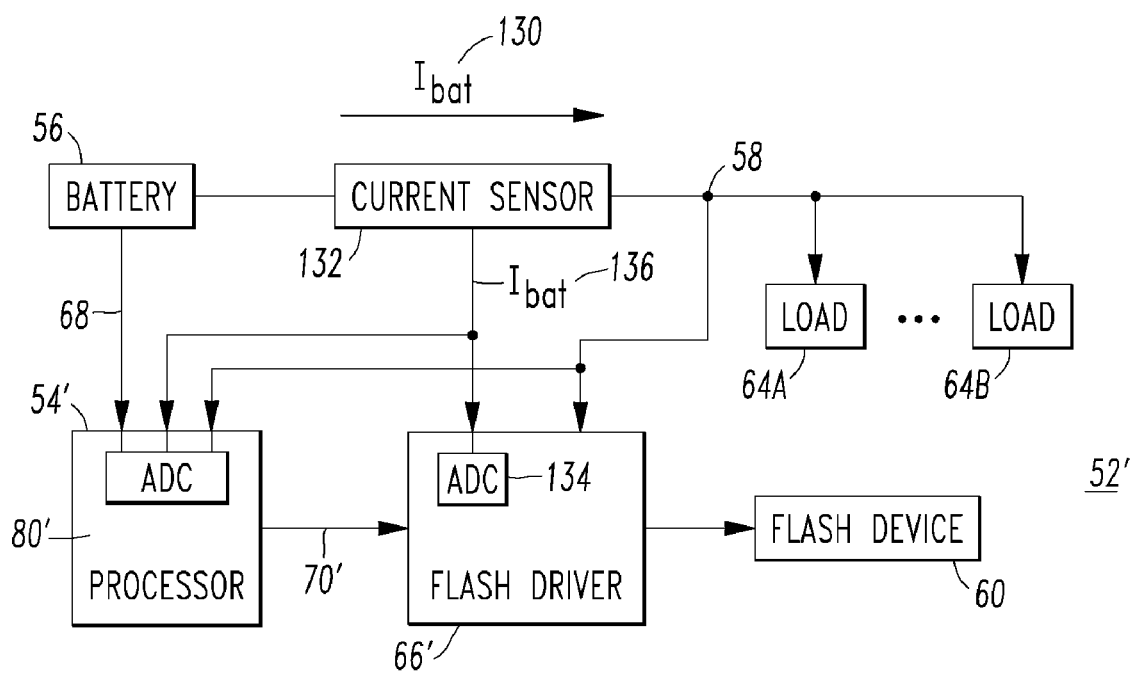
FIG. 5 is a block diagram of a handheld electronic device in accordance with another embodiment of the disclosed and claimed concept.

An alternative embodiment of a handheld electronic device 52', which is somewhat similar to the handheld electronic device 52 of FIG. 3, is shown in FIG. 5. Here, a processor 54' includes a routine 80', which, prior to the flash from the flash device 60, determines an array of a plurality of Vmin(I(hl)) values 70' from Equation 2.

$$V\min(I(hl)) = V\text{low-sys} + I(hl) * ESR \qquad \text{(Eq. 2)}$$

wherein:

I(hl) is a possible battery current which can include a number of different fixed and variable current loads 64A,64B (e.g., without limitation, heavy current loads; radios) that could occur, if active, during a flash from the flash device 60;

ESR is either Vbat/Ibat, or ESR(T) of Equation 1; and

Vmin(I(hl)) is an array of Vmin values 70' as a function of I(hl) prior to the flash; the flash driver 66' can access this array using, for example, I(hl)=Ibat 136 of FIG. 5 as the index.

During the flash, the flash driver 66' uses, for example, a suitable current sensor 132 (e.g., without limitation, a suitable series resistor (R)) and ADC 134 to provide a sensed current from the battery current (Ibat) 130 flowing from the battery 56. The example current sensor embodiment determines the voltage (Vr) across a resistor (R), in order to determine the present battery current, Ibat 130 (e.g., using sensed Ibat 136=Vr/R). In turn, the flash driver 66' selects the corresponding Vmin value 70' from the array Vmin(I(hl)) using the sensed Ibat 136 value, after which the battery voltage Vbat 58 is compared to the selected Vmin value 70' in a manner similar to that discussed above in connection with FIGS. 3 and 4. This example provides a relatively more accurate determination of the battery load and, thus, a relatively more accurate selection of the suitable corresponding Vmin value 70'.

EXAMPLE 15

Although examples have been disclosed of selecting a corresponding one of a plurality of different voltage values as a function of: (a) a determined number of loads 14 which are active, and (b) a current 24 flowing from a battery, it will be appreciated that one or both of these functions can be employed. As a non-limiting example, after a number of loads 14 which are active is determined, that number can be confirmed using the current 24 flowing from the battery. As another non-limiting example, after the current 24 flowing from the battery is determined, that current can be confirmed by determining the number of loads 14 which are active.

The disclosed and claimed concept does not calculate the ESR of the battery 56 during the flash. Instead, before the flash, various minimum voltage (Vmin or threshold) values 70 for combinations of any number of the various high current loads 64A,64B,64C are calculated by the processor 54 and stored in the flash driver 66. After this occurs, relatively few calculations are performed by the flash driver 66 during the flash, which can be performed, for example, by a relatively simple hardware circuit. Hence, this reduces or preferably minimizes the calculations done by the processor 54 during the flash.

The disclosed and claimed concept uses, for example, a programmable current drive controlled by the processor 54. This can be applied to any handheld electronic device having a flash, usually in connection with a camera, such as 76.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of driving a flash device of a handheld electronic device including a number of loads powered by a battery having a voltage, said flash device including a flash current, said method comprising:
    determining a temperature operatively associated with said battery;
    determining a plurality of different voltage values corresponding to a plurality of different combinations of said number of loads as a function of said determined temperature;
    starting said flash device at a predetermined value of said flash current;
    selecting a corresponding one of the plurality of different voltage values as a function of:
        (a) a determined number of said number of loads which are active, or (b) a current flowing from said battery;
    determining the voltage of said battery;
    if the voltage of said battery is less than or equal to said corresponding one of said plurality of different voltage values, then reducing said flash current below the predetermined value of said flash current until the voltage of said battery is greater than said corresponding one of said plurality of different voltage values, and
    after said starting said flash device, repetitively repeating said determining the voltage of said battery and repetitively repeating said reducing said flash current if the voltage of said battery is less than or equal to said corresponding one of said plurality of different voltage values.

2. The method of claim 1 further comprising
    determining said determined number of said number of loads which are active;
    selecting said corresponding one of said plurality of different voltage values as the function of said determined number of said number of loads which are active;
    employing T as said temperature operatively associated with said battery;
    determining each of said plurality of different voltage values from Vmin=Vlow-sys+I(hl)*ESR(T);
    employing Vlow-sys as a voltage at which said handheld electronic device will reset or shutdown;
    employing I(hl) as the sum of a plurality of different current loads that could occur after said starting said flash device; and
    employing ESR(T) from a look-up table of equivalent series resistance of said battery versus temperature operatively associated with said battery.

3. The method of claim 1 further comprising employing about 900 mA as said predetermined value of said flash current.

4. The method of claim 1 further comprising employing as said number of loads powered by the battery up to about three different radios powered by said battery.

5. The method of claim 1 further comprising
    determining that the voltage of said battery is less than said corresponding one of said plurality of different voltage values;
    stopping said flash device responsive to the voltage of said battery being less than said corresponding one of said plurality of different voltage values; and
    alerting said processor of said stopping.

6. The method of claim 1 further comprising
    employing as said number of loads powered by the battery at least two different loads powered by said battery;
    selecting at least four of said plurality of different voltage values; and
    after said starting said flash device, determining which number of said at least two different loads are active and selecting said corresponding one of said plurality of different voltage values as the function of said determined number of said number of loads which are active.

7. The method of claim 1 further comprising
    determining a plurality of said plurality of different voltage values from Vmin(I(hl))=Vlow-sys+I(hl)*ESR;
    employing I(hl) as a possible current from said battery corresponding to a number of said number of loads powered by said battery;
    employing ESR from: (a) a look-up table of equivalent series resistance of said battery versus temperature operatively associated with said battery, or (b) the determined voltage of said battery divided by the current flowing from said battery; and
    employing Vlow-sys as a voltage at which said handheld electronic device will reset or shutdown.

8. The method of claim 7 further comprising
    employing a current sensor to provide a sensed current from said current flowing from said battery; and
    determining said corresponding one of said plurality of different voltage values from said sensed current and from said plurality of said plurality of different voltage values.

9. The method of claim 8 further comprising comparing the voltage of said battery to said determined corresponding one of said plurality of different voltage values.

10. A handheld electronic device comprising:
    a processor;
    a battery having a voltage;
    a flash device including a flash current;
    a number of loads powered by said battery; and
    a flash driver structured to output said flash current to said flash device,
        wherein said processor is structured to determine a temperature operatively associated with said battery, determine a plurality of different voltage values corresponding to a plurality of different combinations of said number of loads as a function of said determined temperature, and start said flash device at a predetermined value of said flash current, wherein said flash driver is structured to select a corresponding one of the plurality of different voltage values as a function of: (a) a determined number of said number of loads which are active, or (b) a current flowing from said battery; determine the voltage of said battery, and if the voltage of said battery is less than or equal to said corresponding one of said plurality of different voltage values, then reduce said flash current below the predetermined value of said flash current until the voltage of said battery is greater than said corresponding one of said plurality of different voltage values, and wherein said flash driver is further structured, after said flash device is started, to repetitively repeat said determine the voltage (Vbat) of said battery and repetitively repeat said reduce said flash current if the voltage (Vbat) of said battery is less than or equal to said corresponding one of said plurality of different voltage values.

11. The handheld electronic device of claim 10 wherein said flash driver is further structured to said repetitively repeat said determine the voltage (Vbat) of said battery and said repetitively repeat said reduce said flash current until stopping said flash device.

12. The handheld electronic device of claim 10 wherein said flash driver is external to said processor.

13. The handheld electronic device of claim 12 wherein said flash driver is a hardware circuit structured to input a number of: (a) said plurality of different voltage values from said processor; (b) the predetermined value of said flash current from said processor; and (c) a synchronization signal from a camera.

14. The handheld electronic device of claim 10 wherein said processor is structured to save said plurality of different voltage values in said flash driver.

15. The handheld electronic device of claim 10 wherein a temperature sensor is operatively associated with said battery to determine said temperature operatively associated with said battery and output a corresponding analog signal; and wherein said processor comprises an analog to digital converter structured to input said analog signal and output a digital value corresponding to said temperature operatively associated with said battery.

16. The handheld electronic device of claim 10 wherein said flash driver comprises a comparator circuit structured to compare the voltage of said battery with said corresponding one of said plurality of different voltage values.

17. The handheld electronic device of claim 10 wherein said processor comprises an input structured to receive a signal from a camera device; and wherein said processor is further structured to determine said temperature operatively associated with said battery, determine said plurality of different voltage values, and start said flash device responsive to said signal from the camera device.

18. The handheld electronic device of claim 17 wherein said flash driver comprises at least one of: (1) an input from said camera device to stop said flash device; and (2) a timer to stop said flash device a predetermined time period after said flash device is started responsive to said signal from the camera device.

* * * * *